(12) United States Patent
Pichl et al.

(10) Patent No.: US 12,706,496 B2
(45) Date of Patent: Aug. 11, 2026

(54) ROTOR SHAFT, ROTOR, ELECTRICAL MACHINE AND MANUFACTURING METHOD FOR A ROTOR SHAFT

(71) Applicant: HIRSCHVOGEL HOLDING GMBH, Denklingen (DE)

(72) Inventors: Markus Pichl, Boebing (DE); Simon Bair, Rottenbuch (DE)

(73) Assignee: HIRSCHVOGEL HOLDING GMBH (DE)

(*) Notice: Subject to any disclaimer, the term of this patent is extended or adjusted under 35 U.S.C. 154(b) by 365 days.

(21) Appl. No.: 18/119,798

(22) Filed: Mar. 9, 2023

(65) Prior Publication Data

US 2023/0291259 A1 Sep. 14, 2023

(30) Foreign Application Priority Data

Mar. 11, 2022 (DE) ........................ 102022000844.0

(51) Int. Cl.
*H02K 1/30* (2006.01)
*H02K 7/00* (2006.01)
(Continued)

(52) U.S. Cl.
CPC ............... *H02K 1/30* (2013.01); *H02K 7/003* (2013.01); *H02K 7/083* (2013.01); *H02K 9/227* (2021.01)

(58) Field of Classification Search
CPC .......... H02K 7/003; H02K 7/083; H02K 1/28; H02K 1/30; H02K 9/227; H02K 9/223;
(Continued)

(56) References Cited

U.S. PATENT DOCUMENTS 2,206,373 A * 7/1940 Stieber .................... F16B 7/025 403/368
3,958,888 A * 5/1976 Mullenberg ............ F16D 1/093 403/370

(Continued)

FOREIGN PATENT DOCUMENTS

DE 29822338 U1 * 4/2000 ............. F16D 1/095
DE 112013006948 A1 12/2015

(Continued)

OTHER PUBLICATIONS

H. Fang, R. Qu, J. Li, P. Zheng and X. Fan, "Rotor Design for High-Speed High-Power Permanent-Magnet Synchronous Machines," in IEEE Transactions on Industry Applications, vol. 53, No. 4, pp. 3411-3419, Jul.-Aug. 2017, doi: 10.1109/TIA.2017.2684090 (Year: 2017).*

(Continued)

*Primary Examiner* — Christopher M Koehler
(74) *Attorney, Agent, or Firm* — Brooks Kushman P.C.

(57) ABSTRACT

A rotor shaft (100) for a rotor (132), in particular for an electric machine (130), wherein the rotor shaft (100) has a base shaft (102), and wherein a rotor shaft seat (106) for a plate stack (108) is formed on an outer lateral surface (114, 116) of the rotor shaft (100) in the area of the base shaft (102), wherein the rotor shaft (100) comprises a conical sleeve (104), wherein a lateral surface (110) of the base shaft (102) facing the conical sleeve (104) comprises a conical shape which runs opposite to a conical shape of the lateral surface (112) of the conical sleeve (104) facing the base shaft (102). Furthermore, a corresponding rotor and a corresponding electric machine are disclosed, as well as a method for manufacturing such a rotor shaft (100).

18 Claims, 7 Drawing Sheets

(51) Int. Cl.
*H02K 7/08* (2006.01)
*H02K 9/22* (2006.01)

(58) Field of Classification Search
CPC ... F16C 3/16; F16D 1/09; F16D 1/092; F16D 1/097; F16D 2001/0903
USPC ...................... 310/216.121, 216.125, 156.12
See application file for complete search history.

(56) References Cited

U.S. PATENT DOCUMENTS

| | | | | |
|---|---|---|---|---|
| 6,099,199 | A * | 8/2000 | Mullenberg | F16D 1/093 403/370 |
| 8,446,121 | B1 * | 5/2013 | Parsa | H02K 29/03 310/156.01 |
| 2002/0195887 | A1 * | 12/2002 | Kobayashi | H02K 9/19 310/61 |
| 2003/0146667 | A1 * | 8/2003 | Hattori | H02K 1/32 310/61 |
| 2012/0326555 | A1 * | 12/2012 | Arimatsu | H02K 1/30 310/216.121 |
| 2013/0113324 | A1 * | 5/2013 | Shepard | H02K 15/03 29/598 |
| 2015/0145365 | A1 * | 5/2015 | Fujii | H02K 1/276 310/156.01 |
| 2015/0340917 | A1 | 11/2015 | Ikura | |
| 2016/0141931 | A1 * | 5/2016 | Kawai | H02K 1/30 310/216.121 |
| 2017/0237316 | A1 * | 8/2017 | Filgertshofer | H02K 7/083 310/52 |
| 2018/0147937 | A1 * | 5/2018 | Muster | H02K 9/00 |
| 2020/0204022 | A1 * | 6/2020 | Karmaker | H02K 3/12 |
| 2021/0131482 | A1 * | 5/2021 | Pethick | F16C 3/026 |

FOREIGN PATENT DOCUMENTS

| | | | |
|---|---|---|---|
| DE | 102015108817 | A1 | 12/2016 |
| DE | 102016208762 | A1 | 11/2017 |
| DE | 102016215595 | A1 | 2/2018 |
| DE | 102018204436 | A1 * | 9/2019 |
| DE | 102019008251 | A1 | 6/2020 |
| DE | 102020007864 | A1 | 3/2021 |
| DE | 102020121724 | A1 | 2/2022 |
| EP | 2860848 | A1 | 4/2015 |
| JP | 2004286155 | A * | 10/2004 |
| JP | 2006187063 | A * | 7/2006 |
| WO | 2018033180 | A1 | 2/2018 |
| WO | 2022135761 | A1 | 6/2022 |

OTHER PUBLICATIONS

Machine Translation of DE 102018204436 (Year: 2019).*
Machine Translation of DE 29822338 (Year: 2000).*
Machine Translation of JP 2004286155 (Year: 2004).*
Machine Translation of JP 2006187063 (Year: 2006).*
Search Report received in priority application DE 10 2022 000 844.0, dated Oct. 28, 2022. Machine Translation provided.

* cited by examiner

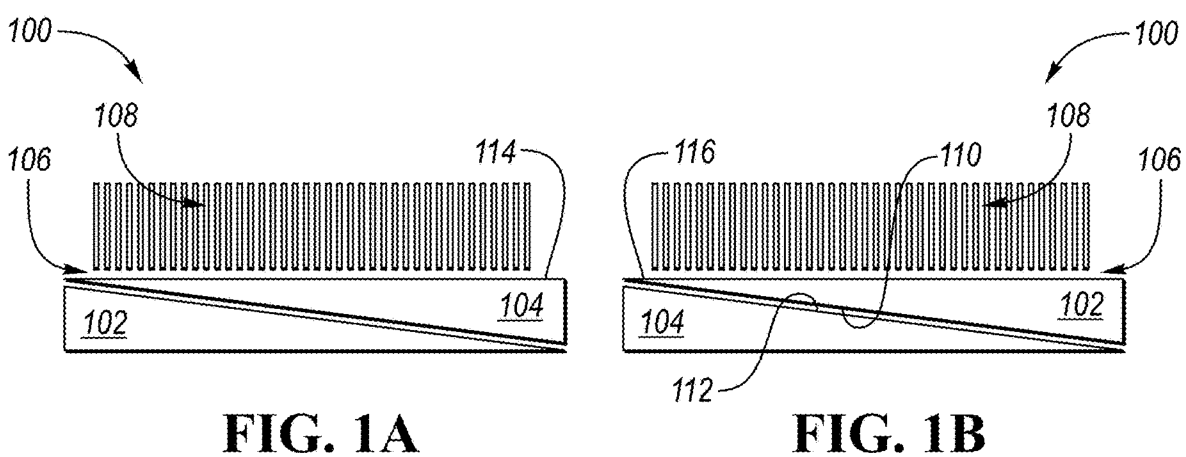
FIG. 1A
FIG. 1B
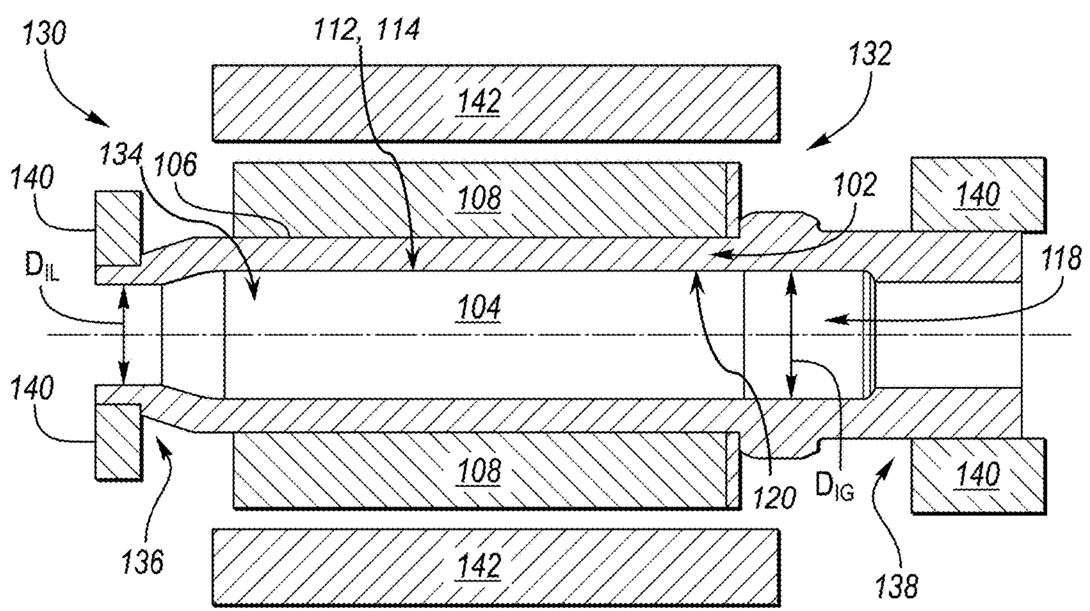
FIG. 2
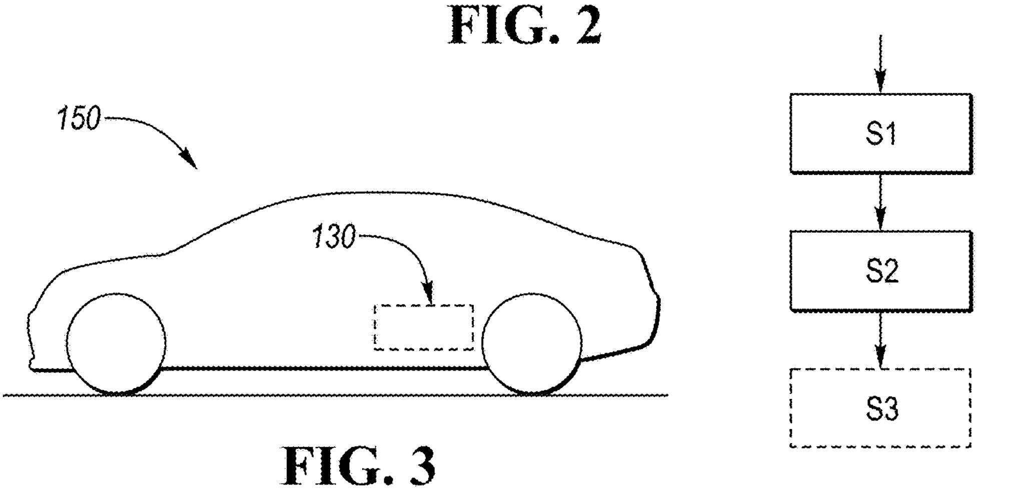
FIG. 3
FIG. 4

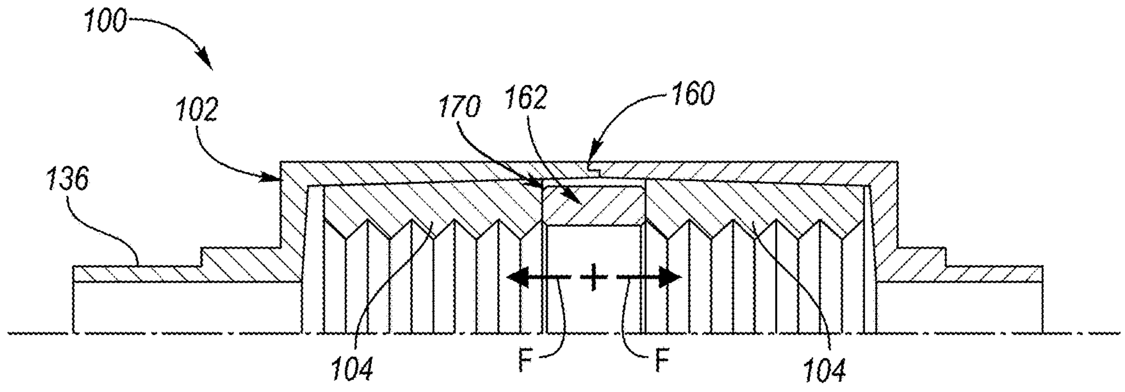
FIG. 11
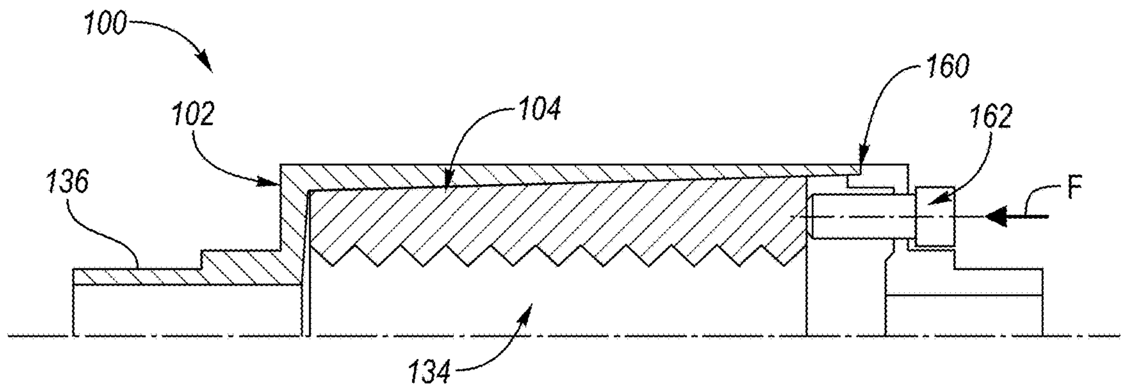
FIG. 12
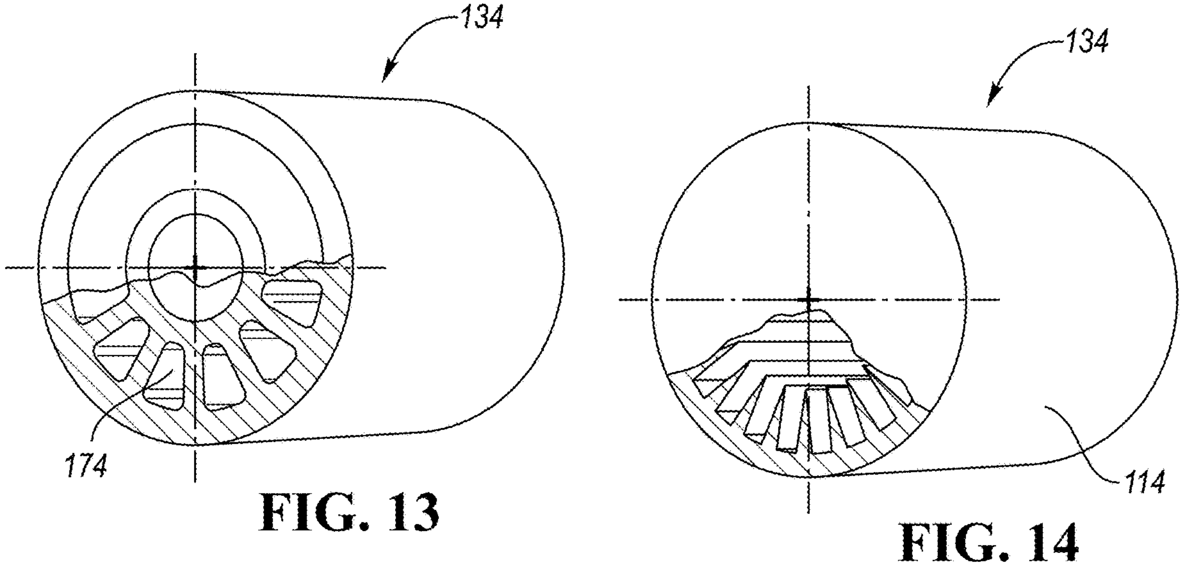
FIG. 13
FIG. 14

ROTOR SHAFT, ROTOR, ELECTRICAL MACHINE AND MANUFACTURING METHOD FOR A ROTOR SHAFT

CROSS-REFERENCE TO RELATED APPLICATIONS

This application claims priority to German Patent Application No. 10 2022 000 844.0 filed on Mar. 11, 2022, the disclosure of which is incorporated in its entirety by reference herein.

TECHNICAL FIELD

The present invention relates to a rotor shaft according to claim 1. The disclosure also relates to a rotor of an electric machine having the rotor shaft, and to an electric machine having the rotor.

BACKGROUND

Rotor shafts are well known and are usually equipped with lamination stacks. These then form a rotor for an electric machine. Electric machines and their operating methods are known and proven in a wide variety of embodiments. In principle, electric machines can be differentiated based on the type of movement of a movable core. In linear motors, an armature performs a linear motion as the core, while in rotary actuators, a rotor rotates as the core. One challenge is to ensure a sufficient connection between the rotor shaft and the lamination stack. One possibility is to achieve this by a frictional fit. The lamination stack is usually joined to the rotor shaft by thermal joining to form a transverse interference fit. This is, however, energy-intensive and therefore expensive, as it usually requires heating the lamination stacks to increase the inner diameter for assembly, and optionally the rotor shaft must also be cooled, for example, with liquid nitrogen, to reduce the outer diameter of the rotor shaft for assembly. A further or supplementary possibility, if the transverse interference fit is not sufficient, is to realize it by a positive mechanical fit. In this case, a longitudinal groove can, for example, be provided in the rotor shaft in which the lamination stack engages. Depending on the implementation, this may result in an inadequate connection or a different manufacturing solution may be sought to save energy (and thus $CO_2$) and costs.

SUMMARY

The object of the present disclosure is to provide a more cost-effective solution for a rotor shaft of the generic type, which is improved or at least represents an alternative embodiment.

The object is solved by the subject matters of the independent claims. Advantageous further developments of the disclosure are indicated in the dependent claims, the description, and the accompanying figures. In particular, the independent claims of one claim category may also, analogously, be further developed to the dependent claims of another claim category.

A rotor shaft according to the disclosure comprises a base shaft. A rotor shaft seat for a plate stack is formed on the outer lateral surface of the rotor shaft. The plate stack can also be referred to as a lamination stack or rotor lamination stack, which is formed in the shape of a hollow cylinder such that the rotor shaft may be arranged in it. The rotor shaft moreover comprises a conical sleeve. A lateral surface of the base shaft facing the conical sleeve has a conical shape. A lateral surface of the conical sleeve facing the base shaft also has a conical shape. The conical shape of the base shaft is opposite to the conical shape of the conical sleeve.

A conical shape is understood to be a shape that tapers in one direction. Thus, a conical shape is understood to be a rotational surface which is configured or defined by a curve, in particular a straight line, that rotates about an axis. In this manner, a conical shape may be a lateral surface of a truncated cone if the curve rotating about the axis is a straight line. A conical sleeve may be understood as an elongated, round, internally hollow body, with at least one lateral surface, i.e., the inner sheath or the outer sheath, having a conical shape.

The rotor shaft seat may be formed in a cylindrical shape. In particular, the rotor shaft seat may be formed in a circular-cylindrical shape. Optionally, a groove or projection may also be provided in the rotor shaft seat to additionally create a positive mechanical fit between the rotor shaft and the plate stack.

Torque can be transmitted via the transverse interference fit. As no thermal joining is necessary in the herein-disclosed rotor shaft, the energy required to produce such a rotor shaft is much lower than in previously known solutions. This can also be easily integrated into a manufacturing process.

Due to the conical tensioning, a high preload may be achieved. In summary, a cost-effective solution is thus created which, when compared to previously known solutions, also leads to a reduction in the use of $CO_2$.

The rotor shaft may be provided for an electric machine. In so doing, it may be a current-excited electric machine. The electric machine may be a permanent-magnet synchronous motor (PSM), in which stator windings are supplied with three-phase current and bring about a rotating magnetic field. In so doing, there are permanent magnets in the rotor and the rotor follows the magnetic field of the stator without slippage. The electric machine may be a separately excited synchronous motor (SESM—separately excited synchronous motor/CESM—current excited synchronous motor), in which stator windings are supplied with three-phase current and bring about a rotating magnetic field. Slip rings transmit direct current to the excitation winding of the rotor. The rotor thereby follows the magnetic field of the stator without slippage. The electric machine may also be an asynchronous motor (ASM). In this case, the stator windings are supplied with three-phase current and bring about a rotating magnetic field; the rotating magnetic field induces current in short-circuit bars of the rotor and thus generates an opposing field. The rotor is always slower than the stator (slippage).

The conical shape may have a different pitch in different sections. In this way, the curve rotating about the axis, which describes the conical shape, may have a monotonic or strictly monotonic course (increasing or, respectively, decreasing). In particular, the pitch of the curve rotating about the axis and describing the conical shape may be constant over a wide area, which is to say at least 50%, in particular at least 80%, in particular at least 95% of the course. The pitch may be less than 7°, preferably less than 3°, more preferably less than 1.7°, or less than 1.3°. The gradient may be at least 0.5°, preferably at least 0.8° and more preferably at least 1°. For example, the pitch may be in a range between 0.5° and 3°.

The conical sleeve may be made from a first material and the cooling device may be made from a second material that is different from the first material. The two materials may have a different coefficient of thermal conductivity and/or a higher coefficient of thermal expansion. In particular, the material lying radially inside may have a higher coefficient of thermal expansion, i.e., if the conical sleeve is arranged within the base shaft, the material of the conical sleeve may have a higher coefficient of thermal expansion than the material of the base shaft. Conversely, if the conical sleeve surrounds the base shaft, the material of the base shaft may have a higher coefficient of thermal expansion than the material of the conical sleeve. This improves a frictional fit between the rotor shaft (in particular, the rotor shaft seat) and the plate stack arranged thereon.

The conical sleeve may be slotted at least in sections. The conical sleeve may thus have an elongated, narrow opening, which extends from the inner lateral surface to the outer lateral surface and is axially aligned. The slot may extend over the entire length of the conical sleeve; the slot may be interrupted once or a number of times. Assembly may be facilitated by the slot as the circumference may be varied easily. In this way, tolerances can be compensated.

Bearing areas may be provided at the longitudinal ends of the rotor shaft. A bearing area may thus be configured at each end of the base shaft. The bearing area may also be referred to as a bearing seat. Thus, a first bearing area may be configured at a first end of the base shaft and a second bearing area may be configured at a second end of the base shaft or the conical sleeve that is opposite the first end. The first bearing area may be connected to the base shaft in a frictional fit, positive mechanical fit, or materially bonded manner. Alternatively, the second bearing area may be connected to the base shaft or the conical sleeve using a frictional fit, a positive mechanical fit, or a material bond. The bearing areas may have a smaller (inner) diameter than the rotor shaft seat or respectively the base shaft and/or the conical sleeve.

The conical sleeve may rest against the inner lateral surface of the base shaft, and the rotor shaft seat may be formed on an outer lateral surface of the base shaft. Thus, the conical sleeve may be arranged in the base shaft, configured as a hollow shaft. The rotor shaft seat may thus be formed on the base shaft.

Alternatively, the conical sleeve may be in contact with the outer lateral surface of the base shaft, and the rotor shaft seat may be formed on an outer lateral surface of the conical sleeve. Thus, the conical sleeve may surround the base shaft.

The base shaft may be formed from a number of parts. The base shaft may be formed from at least two parts. The two or more parts of the base shaft may be joined to each other by a material bond and/or by a positive mechanical fit, and/or by a frictional engagement. A fixed connection of the individual parts or elements of the base shaft may be achieved. Individual parts of the base shaft may be manufactured in a production-optimized manner and then joined later. The conical shape of the base shaft may also be configured as an insert component or as an insert sleeve. The insert sleeve may have a conical shape on a lateral surface, whereas the base body of the base shaft has a purely cylindrical shape. This may be advantageous from a manufacturing point of view. Force may also be transmitted through an insert component or insert sleeve via joints.

When considering the one-piece or multi-piece nature of the base shaft, this can include not only the rotor shaft seat, but rather also the bearing seats or bearing areas. The bearing area or bearing areas, formed at the longitudinal end of the base shaft and/or of the conical sleeve, may be formed by reducing at least one inner diameter of the rotor shaft in this area. This can be achieved, for example, by extrusion or by rotary swaging.

The conical sleeve may be configured from at least two parts. This offers advantages in terms of production and assembly. The conical sleeve may be divided in the axial direction and the at least two parts of the at least two-part conical sleeve may have cones that move in opposite directions to each other, i.e. the first part conical sleeve has a rising cone, whereas, in the same direction, the second part conical sleeve has a falling cone.

The conical sleeve can be axially tensioned against the base shaft by at least one fastening element such as a screw or bolt, or a mounting element (this can also be a screw or bolt) to exert a radially acting force on the plate stack. The fastening element remains in the rotor shaft, whereas the mounting element may be removed after tensioning. Weight can advantageously be saved with a mounting element.

If the conical sleeve is configured with at least two parts, the two conical sleeves divided in two (or the two parts of the two-part conical sleeve) may be tensioned against each other. The two conical sleeves may be formed as mirror images of each other, so they can be identical parts.

The rotor shaft may include a cooling device arranged in the cavity of the base shaft to increase a surface area of the inner lateral surface of the base shaft and to conduct a cooling fluid in the base shaft. The cooling device and the base shaft may be made from different materials. The material of the cooling device has a higher coefficient of thermal conductivity and a higher coefficient of thermal expansion than the material of the base shaft to improve a frictional fit between the rotor shaft and a plate stack arranged thereon during operation.

In a special embodiment, the conical sleeve may be configured as a cooling device. In this way, an additional function can be achieved without using a large amount of material.

The concept of the cooling device is that its outer lateral surface is in contact with the inner lateral surface of the base shaft, and that the cooling device has a larger surface on the inside than the inner lateral surface of the base shaft. Since the material of the cooling device has a higher coefficient of thermal expansion than the base shaft, the cooling device will expand more than the base shaft under the influence of heat during operation and thus exert a radially outward pressure on the base shaft at the inner lateral surface of the base shaft. With increasing load and the associated increase in heat generation, this effect is intensified and thus acts on the connection between the plate stack and the base shaft in the area of the rotor shaft seat. The cooling device can, alternatively, also be a separate component that comes in contact on the inside of an inner lateral surface of the conical sleeve.

The material of the cooling device may be an alloy. In particular, the material of the cooling device may be aluminum or an aluminum alloy. Alternatively, the material of the cooling device may be a thermal material of a plastic interspersed with a special film material. As a further alternative, the material of the cooling device may be copper or a copper alloy. The material of the base shaft may, in particular, be steel or a steel alloy.

An outer contour or outer lateral surface of the cooling device may be in contact with the inner lateral surface of the base shaft. Thus, the heat transfer from the base shaft to the cooling device can be optimized.

The cooling device may be formed as an extrusion. The extruded profile may have cooling channels formed in honeycomb-shape. Alternatively, the cooling device may be formed by a sheet metal forming process. In particular, the cooling device may have a corrugated profile. The corrugated profile may result in the longitudinal direction or, alternatively, transverse to the longitudinal direction. If the corrugated profile is formed in the longitudinal direction, the ribs of the corrugated profile may additionally have a further corrugated shape. In a non-limiting example, the cooling device may also be a corrugated tube. Both extruded profiles and, alternatively, inserts from a sheet metal forming process may be manufactured inexpensively in series (as mass-produced goods).

The cooling device may be made by a sheet metal forming process. The cooling device may then have corresponding corrugations, for example analogous to a corrugated tube. A corrugated tube is a tube made of rigid material with a diameter that changes in a corrugated manner, which may have become partially flexible due to the corrugation. Corrugated tubes made of metal are also called metal bellows or pleated metal bellows. The corrugation may have a parallel ring-shaped configuration. Spiral-shaped corrugations with different formations are preferred. The spiral-shaped corrugations result in a lesser pressure loss than those made by parallel ring-shaped forming, and also result in better swirling of the cooling fluid.

In this manner, the shaft profile may have breakthroughs to direct the cooling fluid to the inner lateral surface of the base shaft and to prevent that there is the presence of insulating or poorly heat-dissipating cavities.

The cooling device may be formed in one piece. This allows the cooling device to be inserted into the base shaft with little effort. Thus, the assembly is simplified.

To improve the thermal connection of the cooling device to the rotor shaft, a heat conducting material may be arranged between the cooling device and the base shaft. A heat conducting material may be a thermal interface material, thermal paste, heat conducting medium, or alternatively gap filler for heat dissipation and for tolerance compensation in the case of existing gaps. Advantageously, a (partially) rough surface can be compensated and an optimized heat transfer between the base shaft and the cooling device can be created.

The base shaft and/or the conical sleeve may be produced by forming technology. A rotor shaft may thus be produced cost-effectively in large quantities.

The basic shape of the base shaft and/or the conical sleeve, or alternatively the rotor shaft, may be configured as a drawn tube. The bearing area provided at at least one end of the base shaft may also be formed at least on one side of the base shaft after the conical sleeve has been inserted into the base shaft. Depending on the bearing seat requirements, this can be inexpensive and efficient. The rotor shaft may thus be made in one piece, not just after assembly in a subsequent production step, but from the beginning, with the final shape of the base shaft being formed only in a later production step after insertion of the conical sleeve. An inner diameter of the bearing areas may be smaller than an inner diameter of the base shaft in the area of the rotor shaft seat.

The base shaft may be formed in several pieces. An inner diameter of the bearing areas may be smaller than an inner diameter of the base shaft in the area of the rotor shaft seat.

A wall thickness of the base shaft in the area of the rotor shaft seat may be less than 8 millimeters. Preferably, the wall thickness of the base shaft in the area of the rotor shaft seat may be less than 6 millimeters. More preferably, the wall thickness of the base shaft in the area of the rotor shaft seat may be less than 4 millimeters.

A cross-sectional area of the base shaft may taper from the center towards the edge areas, in particular in a continuous manner. The center refers to the longitudinal extent, that is between the end areas of the base shaft. The cross-sectional area in the middle of the rotor shaft seat may be at least 10% larger, in particular 30% larger, than in the edge areas of the rotor shaft seat in the direction of the bearing areas. In particular, the wall thickness may decrease in a linear manner, in particular parabolically. This can be achieved by using more material in the inner diameter, or alternatively, with indentations, which become deeper from the inside to the outside. The cross-sectional area may be created by a uniformly changing wall thickness or by constant lateral surfaces with corresponding partial recesses.

A rotor for a current-excited machine may have a rotor shaft as disclosed herein and a plate stack arranged on the rotor shaft in the area of the rotor shaft seat.

An electric machine may include a variant of a rotor disclosed herein. Furthermore, a stator may be provided, wherein the rotor that is rotatable about a rotor rotation axis is arranged in the stator. Such a machine may be referred to as an electric motor, engine, or generator.

A method of manufacturing such a rotor shaft may include the following steps:

- providing a base shaft for a rotor shaft and a conical sleeve, wherein one of the lateral surfaces of the base shaft facing the conical sleeve has a conical shape which is opposite to the conical shape of the lateral surface facing the base shaft of the conical sleeve; and
- tensioning of the conical sleeve relative to the base shaft to improve a friction fit between the rotor shaft and the plate stack arranged thereon.

The inventive idea will be described in more detail below with reference to the figures. The following description is, however, to be regarded to be purely exemplary. The disclosure is determined by the subject matter of the claims. Advantageous exemplary embodiments are explained below with reference to the accompanying figures. The same reference numbers are used for the same elements or elements having the same effect. Furthermore, for the sake of easier legibility and assignability, reference numbers are also used for features if these are not shown in the figure described. Moreover, in similar figures, not all reference numbers are always illustrated if these features are already clearly designated in the preceding figures.

BRIEF DESCRIPTION OF THE DRAWINGS

FIG. 1A and FIG. 1B show a simplified representation of a rotor shaft according to one or more non-limiting examples disclosed herein;

FIG. 2 shows a schematic representation of an electric machine having a rotor according to one or more non-limiting examples disclosed herein;

FIG. 3 shows a vehicle having an electric machine according to one or more non-limiting examples disclosed herein;

FIG. 4 shows a flowchart of a method according to one or more non-limiting examples disclosed herein;

FIG. 7 to FIG. 12 show exemplary cross-sectional views of rotor shafts according to one or more non-limiting examples disclosed herein;

FIG. 13 and FIG. 14 show exemplary cross-sectional views of cooling devices according to one or more non-limiting examples disclosed herein;

DETAILED DESCRIPTION

Figure 5:
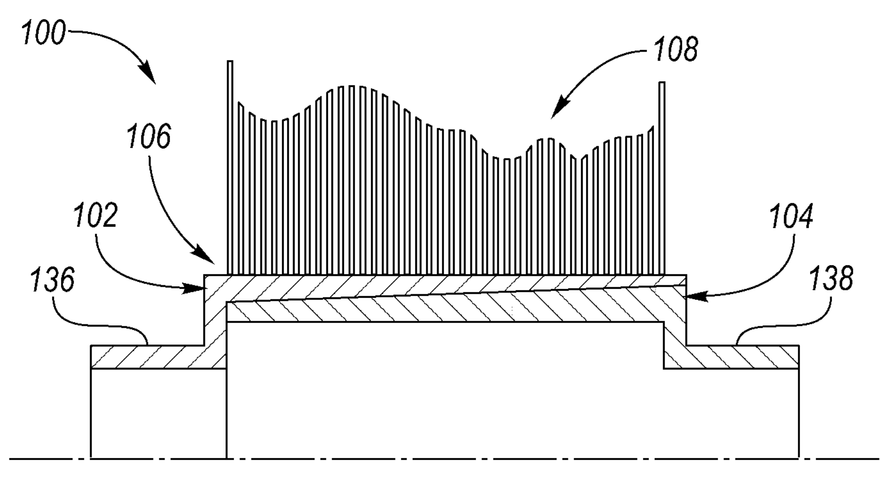
FIG. 5 and FIG. 6 show a simplified representation of a rotor shaft according to one or more non-limiting examples disclosed herein.

FIG. 1 shows a rotor shaft 100, which is provided for an electric machine 130, as illustrated in FIG. 2. The rotor shaft 100 includes a base shaft 102 and a conical sleeve 104. In the area of the base shaft 102, relative to the axial extension of the base shaft 102, a rotor shaft seat 106 is formed for a plate stack 108. The plate stack 108 is arranged on the rotor shaft seat 106. The mutually facing lateral surfaces 110, 112 of the base shaft 102 and the conical sleeve 104 each have a corresponding conical shape, i.e. they may lie directly in contact with each other and be tensioned against each other. FIG. 1A and FIG. 1B differ from each other by the arrangement of the conical sleeve 104 relative to base shaft 102. In FIG. 1A, the conical sleeve 104 surrounds the base shaft 102. Thus, the rotor shaft seat 106 is configured on an outer lateral surface 114 of the conical sleeve 104. In FIG. 1B, the conical sleeve 104 is arranged on the inside of the base shaft 102. In this way, the rotor shaft seat 106 is configured on an outer lateral surface 116 of the base shaft 102.

The choice of material of base shaft 102 and the conical sleeve 104 is not directly visible from FIG. 1. In a non-limiting example, the conical sleeve 104 and the base shaft 102 are made of different materials, wherein the choice of material depends on the arrangement of the conical sleeve 104 relative to base shaft 102. If the coefficient of thermal expansion of the surrounding body (conical sleeve 104 or base shaft 102) is lesser than the coefficient of thermal expansion of the inner body (base shaft 102 or conical sleeve 104), this has the positive effect in operation of improving a frictional fit between the rotor shaft 100 and a plate stack 108 arranged on the rotor shaft seat 106 (see also FIG. 2). The selection of material of the base shaft 102 and conical sleeve 104 in the two non-limiting examples illustrated in FIG. 1A and FIG. 1B is thus interchanged. The radially inner material thus has a higher coefficient of thermal expansion than the radially outer material to improve a frictional fit between the rotor shaft 100 and a plate stack 108 arranged thereon during operation, wherein the frictional fit between the base shaft 102 and conical sleeve 104 is also enhanced or at least continues to exist.

In FIG. 1A (the conical sleeve 104 surrounds the base shaft 102), the material of the base shaft 102 thus has a higher coefficient of thermal expansion than the material of the conical sleeve 104. In FIG. 1B (the base shaft 102 surrounds the conical sleeve 104), the material of the conical sleeve 104 thus has a higher coefficient of thermal expansion than the material of the base shaft 102.

In one or more non-limiting examples, the two materials are steel or alternatively a steel alloy and aluminum or alternatively an aluminum alloy. Aluminum and an aluminum alloy have a higher coefficient of thermal conductivity and a higher coefficient of thermal expansion than steel and a steel alloy.

An optional variant in which the conical sleeve 104 is slotted at least in sections is not illustrated in FIG. 1. In a first variant, the conical sleeve 104 has a slot extending over the entire axial length. In a second variant, the slot is interrupted at least once, by way of example, the conical sleeve 104 is not interrupted by the slot at one end or centrally. In yet another variant, the conical sleeve has a plurality of slots (in the axial direction), the slots are either arranged in a row and thus present a slot interrupted by small ridges or alternatively that the slots are distributed about the circumference.

In a non-limiting example, the rotor shaft 100 has a cavity 118 as can be seen in a plurality of examples shown below. It is therefore a hollow shaft. The hollow shaft is formed to be open on one or both sides.

FIG. 2 shows an electric machine 130 with a rotor 132. The rotor 132 has a rotor shaft 100, on the rotor shaft seat 106 of which is arranged a plate stack 108. A conical sleeve 104 in the form of a cooling device 134 is arranged in the cavity 118 of the rotor shaft 100. In the example illustrated in FIG. 2, the cone of the base shaft 102 and the conical sleeve 104 each have an angle of less than 1°. A non-limiting example of the cooling device 134, shown schematically, is illustrated in FIG. 13, FIG. 14, FIG. 18A, to FIG. 19, or alternatively also a variant as shown hereinafter in the figures, when the conical sleeve 104 is arranged inside the base shaft 102 (which is formed as a hollow shaft)—or a variation thereof. For this reason, this is also only schematically represented.

A bearing area 136 is configured at each end of the rotor shaft 100, on which bearing area the rotor shaft 100 is supported by bearings 140. The rotor shaft 100 is arranged inside a stator 142. The cooling fluid is not explicitly represented, the cooling fluid can flow in through an opening in the base shaft 102 or alternatively rotor shaft 100, which is configured as a hollow shaft, and then again flow out of the rotor shaft 100, for example on the opposite side. In particular, the outflow of the cooling fluid may occur in various ways, as may be inferred from other disclosures. This does, however, not represent a core of the idea presented here and will therefore not be addressed further.

It is apparent from the non-limiting example illustrated in FIG. 2, and other examples shown herein, that the inner diameter $D_{IL}$ of the bearing area 136 is smaller than an inner diameter $D_{IG}$ of the base shaft 102 (in particular, in the area of the cooling device 134).

An outer contour or outer lateral surface 114 of the cooling device 134 (the lateral surface 112 of the conical sleeve 104 facing the base shaft 102) comes into contact with the inner lateral surface 120 of the base shaft 102 (the lateral surface 110 of the base shaft 102 facing the conical sleeve 104). In this regard, it can be gleaned from FIG. 2 that the outer lateral surface 114 of the cooling device 134, which here represents a conical sleeve 104, has a conical shape. Likewise, the inner lateral surface 120 of the base shaft 102 has a corresponding conical shape. To improve the heat transfer between the base shaft 102 and the conical sleeve 104, or respectively the cooling device 134, a heat conducting material 144 may additionally be arranged between them. In the event of direct contact between the base shaft 102 and cooling device 134, or respectively conical sleeve 104, this material may be pressed to the side and, in particular, fill gaps or other cavities between the two bodies (base shaft 102; cooling device 134/conical sleeve 104).

FIG. 3 shows a vehicle 150 with an electric machine 130.

FIG. 4 shows a manufacturing method. The method includes at least a step S1 "providing", and a step S2 "tensioning." In step S1, a base shaft 102 for a rotor shaft 100, and a conical sleeve 104 are provided, wherein a lateral surface 110 of the base shaft 102 facing the conical sleeve 104 has a conical shape that is opposite to the conical shape of the lateral surface 112 of the conical sleeve 104 facing the base shaft 102. In step S2, the conical sleeve 104 is tensioned relative to the base shaft 102 such that a frictional fit between the rotor shaft 100 and the plate stack 108 arranged thereon is improved.

Moreover, the method may comprise a step S3 "forming" of at least one bearing area. This may be carried out before or after the providing of the base shaft, or it may be carried out after the tensioning step. Depending on the sequence of the steps, a different procedure can be provided. For example, a bearing area may be formed by chipless metal forming, wherein the entire material cross-section is plasticized. Roller burnishing may also be used to constrict and shape the bearing area.

Figure 6:
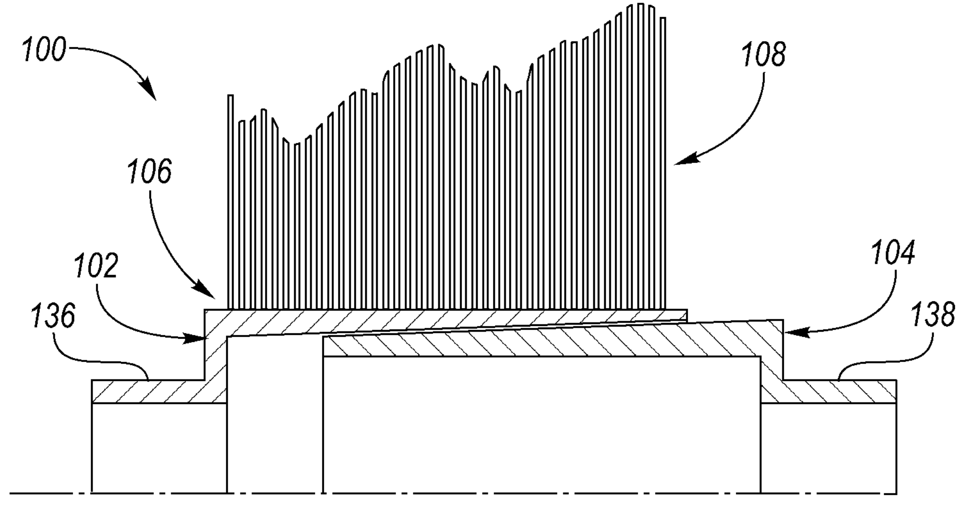

A bearing area 136, 138 at the longitudinal end of the base shaft 102 is illustrated in FIG. 2. In FIG. 2, the bearing areas 136, 138 are connected to the base shaft 102 on both sides, i.e. both the first bearing area 136 and the second bearing area 138 are connected to the base shaft 102, for example, by a material bond. An inner diameter $D_{IL}$ of the bearing areas 136, 138 is smaller than an inner diameter $D_{IG}$ of the base shaft 102 in the area of the rotor shaft seat 106. In FIG. 5 and FIG. 6, the first bearing area 136 is connected to the base shaft 102, the second bearing area 138 is connected to the conical sleeve 104. The connection may be a material bond, in particular the bearing area 136, 138 may also respectively be manufactured in one piece (together with the base shaft 102 or conical sleeve 104), but other connection methods are possible. FIG. 5 shows the fully assembled rotor shaft 100, whereas FIG. 6 represents a condition during joining. Joining also includes compaction or tensioning.

In FIG. 5 and FIG. 6, the base shaft 102 surrounds the conical sleeve 104. In so doing, the reverse arrangement—analogous to FIG. 1A—may be implemented on an equivalent basis. The first bearing area 136 is connected to the base shaft 102, in particular, formed in one piece. The second bearing area 138 is connected to the conical sleeve 104, in particular, formed in one piece.

In FIG. 7 to FIG. 12, the conical sleeve 104 is arranged inside the base shaft 102. The base shaft 102 is generally formed in multiple parts, wherein the individual elements of the base shaft are connected to each other in a material bonded and/or positive mechanical fitting manner. The elements of the base shaft 102 may be connected by a frictional fit. The connecting area 160, clearly visible in the figures, may be varied and, as shown, the connecting area of one non-limiting example may be implemented accordingly in one of the other non-limiting examples. An additional sleeve—not shown in the figures—may also be introduced to reduce the load on the connecting area 160.

Moreover, at least one fastening element 162 is provided to axially tension the conical sleeve 104 relative to the base shaft 102 by the fastening element 162. In so doing, the conical shape of the base shaft 102 and conical sleeve 104 produces a radially acting force on the plate stack 108. The fastening element 162 may also be an assembly element. The latter differs from the fastening element 162 in that the assembly element is removed from the rotor shaft 100 after the conical sleeve 104 has been tensioned, whereas the fastening element 162 remains in the rotor shaft 100. As with the mounting element, the fastening element 162 may be, for example, a screw or a bolt.

Figure 7:
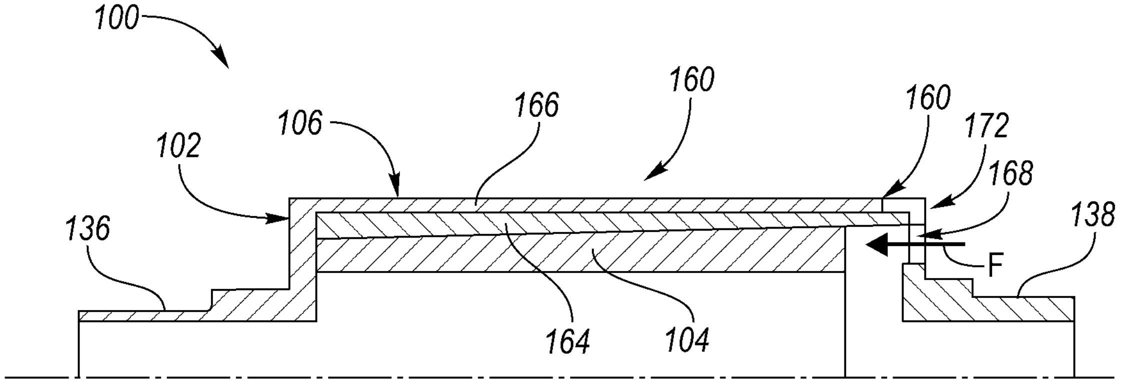

In FIG. 7, the rotor shaft 100 has, in addition to the base shaft 102 and the conical sleeve 104, a further conical sleeve 164, which may also be referred to as an insert or insert sleeve. The further conical sleeve 164 may be considered part of the base shaft 102. A base body 166 of the base shaft 102 has a cylindrical lateral surface on the inside and outside. The conical shape facing the conical sleeve 104 is achieved by the additional conical sleeve 164. The outer lateral surface of the further conical sleeve 164 has a cylindrical shape, and the inner lateral surface of the further conical sleeve 164 has a conical shape that corresponds to the conical sleeve 104.

The rotor shaft 100 has a bearing area 136, 138 at each end, the diameter of which is smaller than that of the base shaft 102. To be able to insert the conical sleeve 104 and the further conical sleeve 164, the base body 166 of the base shaft 102 is divided into at least two parts and is only connected after the insertion of the conical sleeve 104 and of the further conical sleeve 164, in particular connected by a material bond. The connecting area 160 between the at least two parts of the base body 166 experiences only minor loads since the further conical sleeve 164 distributes the radially acting forces evenly. At least one breakthrough 168 is provided on one end side of the base body 166, through which breakthrough the fastening element 162 may introduce an axial force onto the conical sleeve 104. In so doing, two or more breakthroughs 168 may also be provided and, in particular, an equal number of fastening elements 162. Advantageously, three breakthroughs 168 and three fastening elements 162 may be arranged in an equally distributed manner on the end side, in particular, at an angle of 120° to each other.

Figure 8:
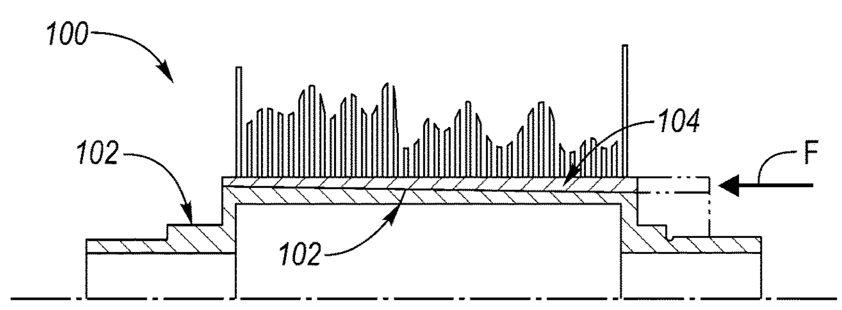

In FIG. 8, the conical sleeve 104 is arranged between the base shaft 102 and the plate stack 108. The base shaft 102 has a conical shape on the outer lateral surface 116, the conical sleeve 104 has a cylindrical shape on the outer lateral surface 114, on which conical sleeve the rotor shaft seat 106 is formed. In this manner, the plate stack 108 is seated on the outer lateral surface 114 of the conical sleeve 104. This non-limiting example may be assembled without the need for an additional fastening element 162, the conical sleeve 104 may be press-fitted to the base shaft 102 with the plate stack 108 arranged directly thereon, wherein the conical sleeve 104 is directly contactable to apply a corresponding axial force.

Figure 9:
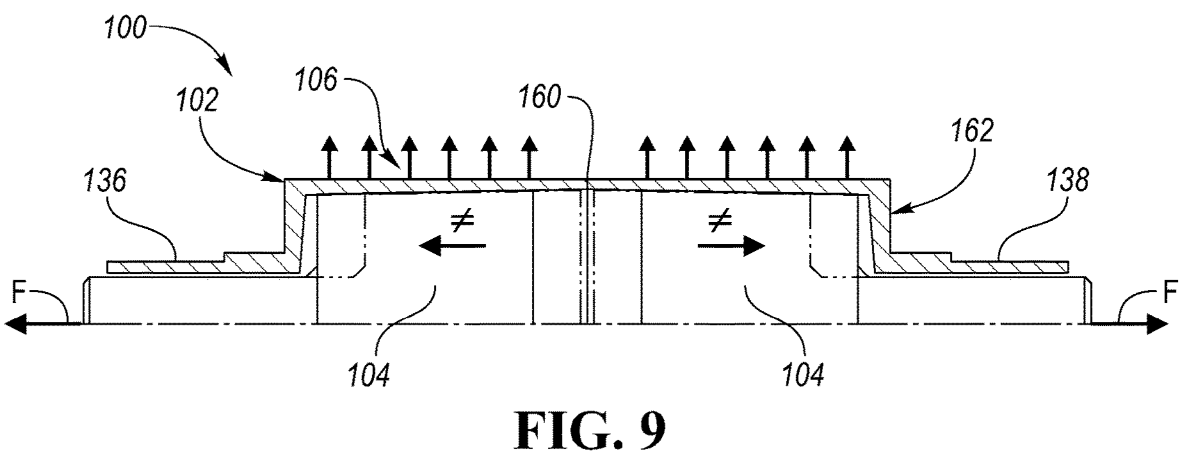
Figure 10:
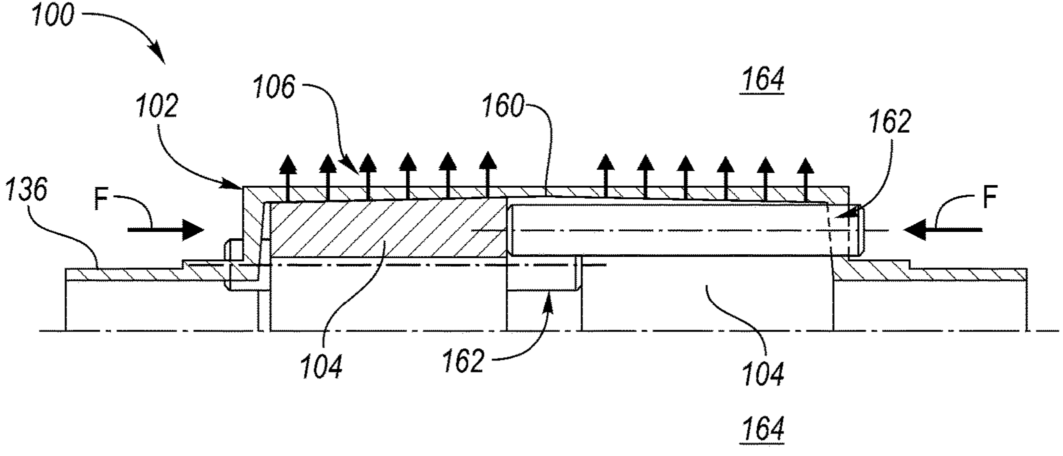

FIG. 9 to FIG. 11 each have a two-part conical sleeve 104 having opposing cones (conical shape) which are tensioned against each other (axially) to apply the radial force in the direction of the plate stack 108. In the non-limiting example of FIG. 9, the base shaft 102 is a hollow shaft, the two parts of the conical sleeve 104 are each pulled "outward" along the axis through the hollow bearing areas 136, 138, i.e. in the opposite direction from each other. The largest diameter is at the center of the base shaft 102, which then respectively tapers outwardly along the axis.

FIG. 10 may be viewed as a combination of the non-limiting examples of FIG. 7 and FIG. 9. In FIG. 9, the conical sleeve 104 is formed in two parts, but these two parts are not drawn together centrally, but rather the end face base shaft 102 has at least one breakthrough 168 on each side between the plate stack 108 and the bearing portion 136, 138. Correspondingly, a breakthrough is also provided in the directly adjacent part of the conical sleeve 104 such that a fastening element 162 is arranged through the breakthrough 168 in the end face of the base shaft 102 and in the directly corresponding breakthrough of the part of the conical sleeve 104. The fastening element presses on the second part of the conical sleeve 104. In a preferred non-limiting example, three fastening elements 162 are provided for each part or half of the conical sleeve 104, which are thus arranged at an angle of 120° to each other. The fastening elements pressing on the second half (second part) of the conical sleeve 104 are offset by half the angle, that is 60°.

In FIG. 11, at least one spacer element 170 is arranged as fastening element 162 between the two parts of the conical sleeve 104. The pre-tensioning must take place during the assembly and thus during the joining of the at least two-part base shaft 102. The connecting area 160 is arranged centrally with respect to the axial extension. In the illustrated non-limiting example, the rotor shaft is largely symmetrically constructed. It is also possible for the two parts of the conical sleeve 104 to have a different length from each other, for example in the ratio of 1:2 or 1:3. Thus, the pitch of the conical outer lateral surface would also preferably be different, in correlation to the length ratio.

In one or more embodiments, the parts of the base shaft 102 are connected to each other by a material bond. In an alternative variant, they are connected by a positive mechanical fit. Both types of connections may be combined.

FIG. 12 shows a one-piece conical sleeve 104 that is tensioned to the base shaft 102 by a fastening element 162. The at least one fastening element is guided through a breakthrough 168 in the end face 172 of the base shaft 102 between the rotor shaft seat 106 and the bearing seat 138. The connecting area 160 is arranged in the area of the rotor shaft seat 106 or alternatively the outer lateral surface 116 of the base shaft 102 near the end face 172.

In FIG. 13, the conical sleeve 104 configured as a cooling device 134 has two tubes arranged one inside the other. The tubes are connected to each other by webs running in the longitudinal direction. The cooling device 134 may be formed as an extruded section. The conical sleeve may also be formed in two parts such that the cooling device 134 has a cylindrical outer lateral surface which is inserted into a conical sleeve 104 having a cylindrical inner lateral surface. A plurality of cooling channels 174 are formed by an extruded profile formed in this manner. In one or more embodiments, the ribs or webs are formed and arranged in such a manner that the cooling channels 174 are formed in a honeycomb shape, whereby a high strength of the cooling structure may be achieved despite lesser wall thicknesses. Since the conical sleeve 104, which is configured as a cooling device 134, has a higher thermal expansion than the base shaft 102 and thus generates an outwardly directed pressure from the inside against the hollow base shaft 102 (radially acting force), the wall thickness of the base shaft 102 may also be reduced in the area of the rotor shaft seats 106, compared to previously known solutions without conical sleeves, without creating a disadvantage in the overall strength. In addition to a honeycomb shape of the cooling channels 174, the cooling channels may also be, for example, diamond-shaped. This special configuration allows for maximum strength combined with maximum outward pressure on the rotor shaft seat 106, and thus the plate stack 108, when the cooling device 134 is installed in one. The conical sleeve 104 configured as a cooling device 134 has a conical shape at the outer lateral surface 114, that is the diameter tapers along the longitudinal extension.

In FIG. 14, ribs or alternatively fins or cooling ribs/cooling fins are formed in the longitudinal direction, each of which has a triangular cross-sectional area in cross-section. In this way, the surface area inside the cooling device 134 may be considerably increased and thus the cooling effect of a cooling fluid improved. Optionally, a cooling channel may also be configured in the ribs. Moreover, the ribs may extend in a wave form or in an "angular wave form," that is in regular or irregular changes of direction per segment in the longitudinal direction. This may create additional turbulence of the cooling fluid flowing through to further improve heat dissipation.

Figure 15:
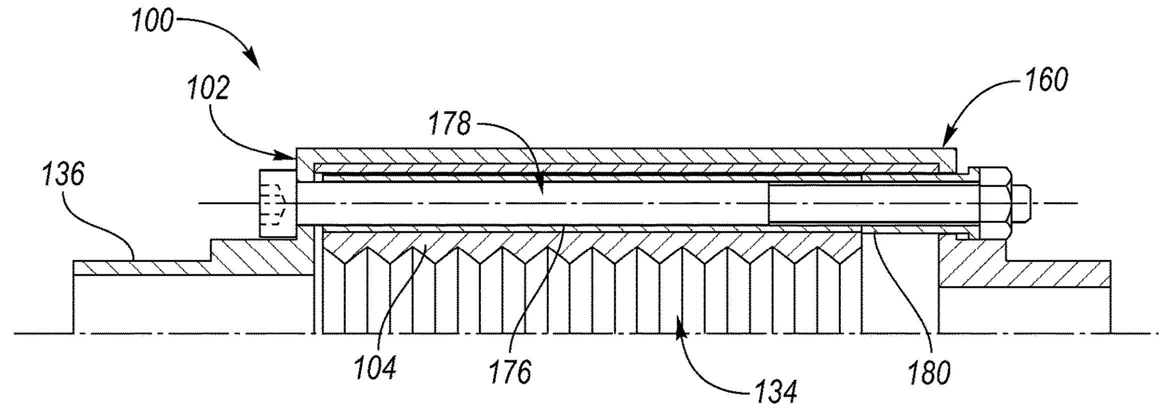
FIG. 15 to FIG. 17 show exemplary cross-sectional views of rotor shafts according to one or more non-limiting examples disclosed herein.

FIG. 15 shows a non-limiting example of a rotor shaft 100, which has similarities to FIG. 12. The base shaft 102 is configured as at least a two-piece design, the one-piece conical sleeve 104 is arranged inside the base shaft 102. A breakthrough 168 is configured in the end face 172 and a breakthrough 176 is configured in the conical sleeve 104. The breakthroughs 168, 176 may be bores. A stud bolt 178 is arranged in the breakthrough 176. Stud bolts are metal bolts which are firmly connected to a component by one of their intersection surfaces and thus "stand up" from the component. Further components may then be connected to the first one via the stud bolts. The stud bolts serve as fastening parts. Since stud bolts 178 are of a special, long design, they may also be referred to as tie rods. On the right-hand side, an intermediate sleeve 180 is arranged around the stud bolt 178. The conical sleeve 104 is pulled to the left in the illustration via the intermediate sleeve and is thereby tensioned with the base shaft 102.

Figure 16:
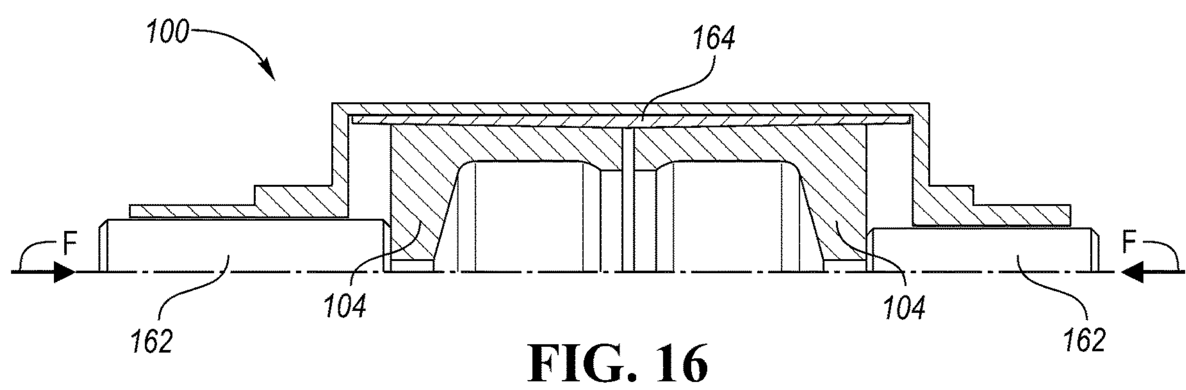
Figure 17:
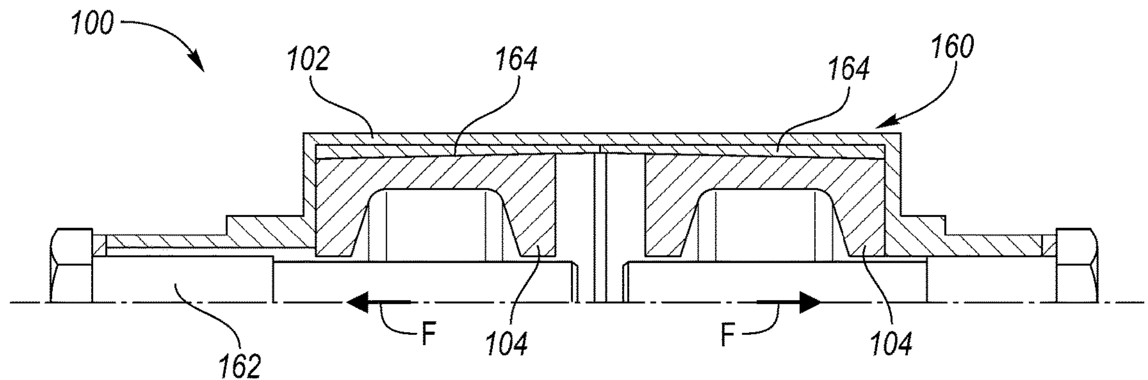

FIG. 16 and FIG. 17 show two similar non-limiting examples, which differ by the direction of the force applied to tension the two-part conical sleeve 104. In FIG. 16, the two conical sleeves 104 are pushed apart, whereas in FIG. 17, the two conical sleeves 104 are pulled together. The cone shape on the inner lateral surface of the base shaft 102 is formed in such a way that the diameter tapers toward the center in FIG. 16, while the diameter tapers toward the outside in FIG. 17.

Figure 18A:
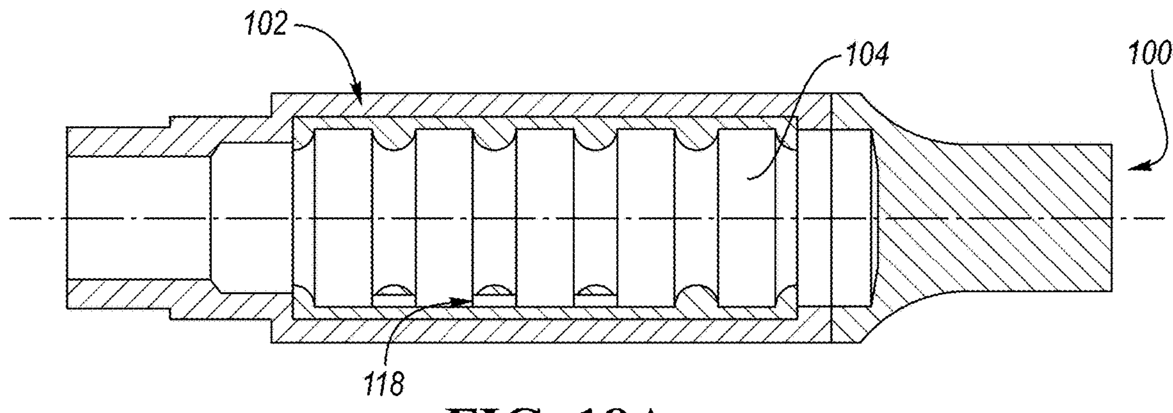
FIG. 18A to FIG. 19 show exemplary sectional views of variants of a cooling device in the rotor shaft according to one or more non-limiting examples disclosed herein.
Figure 18B:
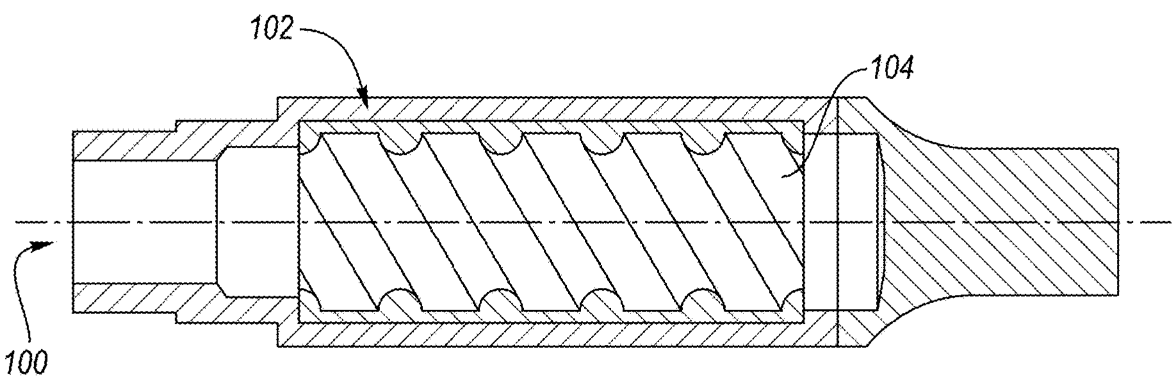
Figure 18C:
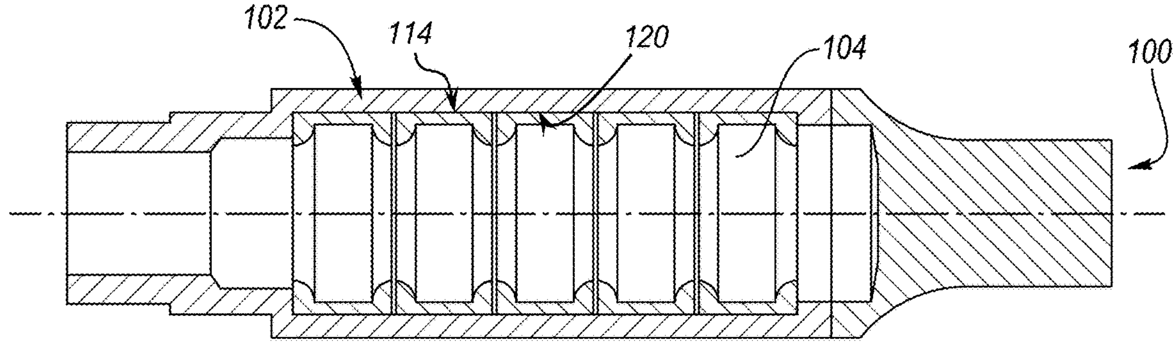
Figure 18D:
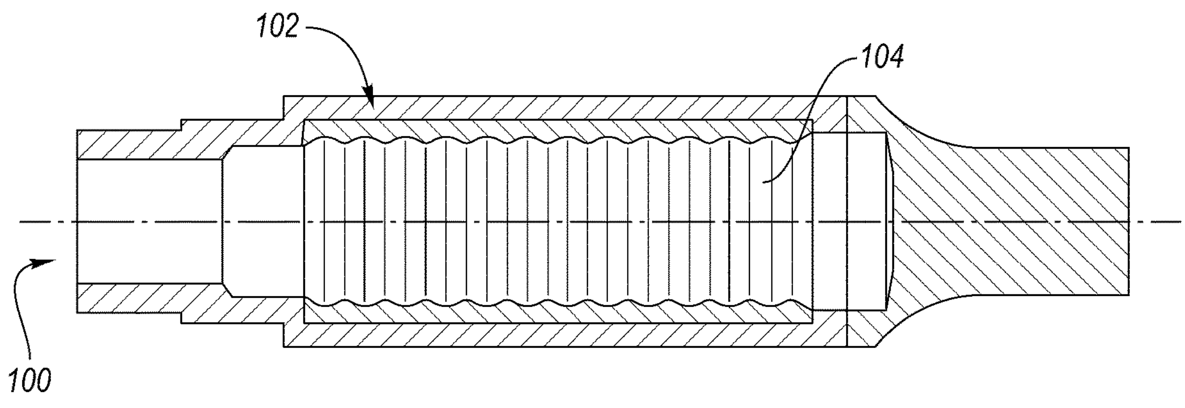
Figure 18E:
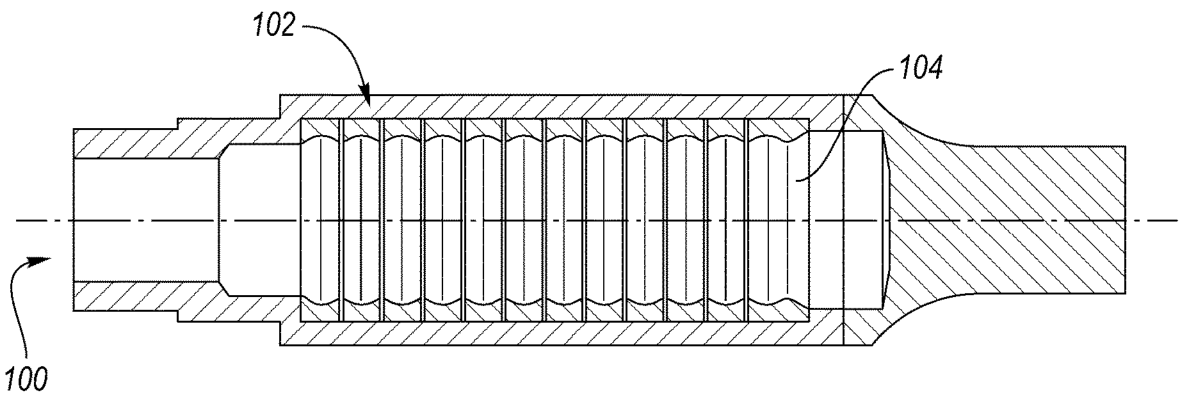
Figure 19:
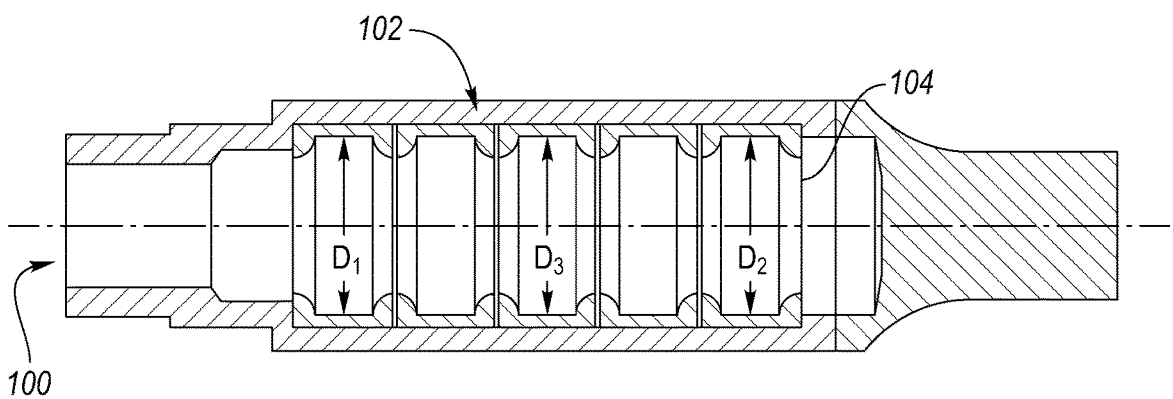

FIG. 18 and FIG. 19 show non-limiting examples in which a cross-sectional area $D_W$ of the base shaft 102 may decrease from the center to the edge areas, in particular continuously, and is at least 10% larger in the center of the rotor shaft seat 106 than in the edge areas of the rotor shaft seat 106 in the direction of the bearing areas 136. In one or more embodiments not shown, the cross-sectional area $D_W$ of the base shaft 102 is at least 20% larger or even at least 30% larger in the center of the rotor shaft seat 106 than in the edge areas of the rotor shaft seat 106 in the direction of the bearing areas 136. The wall thickness thereby decreases, in particular, in a linear manner, in particular in a parabolic shape, by more material in the inner diameter, or alternatively by means of depressions or grooves which become deeper from the inside to the outside.

FIG. 18A through FIG. 18E show various non-limiting examples of a rotor shaft 100, wherein the conical sleeve 104 also has a dual function as a cooling device 134. A principal distinguishing feature is that the outer lateral surface 114 of the cooling device 134 is in full surface contact with the inner lateral surface 120 of the base shaft 102. Thus, the fins of the cooling device 134 are not merely pressed into the sheet metal at an approximately constant wall thickness. Rather, the ribs or alternatively cooling ribs are formed from solid material or material. In FIG. 18A, the individual rounded fins are always spaced apart from each other. In a variant, breakthroughs are provided in the ribs of the corrugated profile so that a cooling fluid may flow through to ensure optimum heat dissipation.

In FIG. 18B, the ribs are formed in a spiral shape, as previously described without illustration. This can be particularly advantageous when using a corrugated tube geometry for cooling device 134 to efficiently dissipate heat.

FIG. 18A shows a cooling device 134 configured in one piece. This contrasts with the multi-part configuration illustrated in FIG. 18C. Each element includes half a rib on each side such that two successive elements form a complete rib.

FIG. 19 shows a multi-part cooling device 134, the edge areas of which are wing-like sheet metal formations. Thus, a full surface contact in the base shaft may be achieved on the one hand and a maximally enlarged surface area may be provided on the other.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCE LIST

100 rotor shaft
102 base shaft
104 conical sleeve
106 rotor shaft seat
108 plate stack
110 lateral surface of the base shaft (facing the conical sleeve)
112 lateral surface of the conical sleeve (facing the base shaft)
114 outer lateral surface of conical sleeve
116 outer lateral surface of base shaft
118 cavity
120 inner lateral surface of the base shaft
130 electric machine
132 rotor
134 cooling device
136 (first) bearing area, bearing seat
138 (second) bearing area, bearing seat
140 bearing
142 stator
$D_{IL}$ inner diameter of bearing areas
$D_{IG}$ inner diameter of the base shaft
144 heat conducting material
150 vehicle
160 connecting area
162 fastening element
164 further conical sleeve
166 base body of the base shaft 102
168 breakthrough
170 spacer element
172 end face
174 cooling channel
176 breakthrough
178 stud bolt
180 intermediate sleeve, blind threaded sleeve
S1-S3 process steps

What is claimed is:

1. A rotor shaft comprising:
a base shaft including a lateral surface having a conical shape,
a rotor shaft seat configured to support a plate stack, the rotor shaft seat located on an outer lateral surface of the rotor shaft in the area of the base shaft,
a conical sleeve including a lateral surface having a conical shape, the lateral surface of the conical sleeve facing the lateral surface of the base shaft, the conical shapes of the base shaft and the conical sleeve running opposite each other, the conical shape of the base shaft and the conical shape of the conical sleeve each having an angle of less than 1°,
a first bearing area provided at a longitudinal end of the base shaft and connected to the base shaft in a force-fit, positive mechanical-fit, or material-fit connection; and
a second bearing area provided at a longitudinal end of the conical sleeve; wherein an inner diameter of the first and second bearing areas is smaller than an inner diameter of the base shaft in the rotor shaft seat.

2. The rotor shaft of claim 1, wherein the conical sleeve and the base shaft are made from different materials and have different coefficients of thermal conductivity and/or coefficients of thermal expansion.

3. The rotor shaft of claim 1, wherein
an opposing tapered interface between the base shaft and the conical sleeve includes a radially outer material forming one of the conical sleeve and the base shaft, and a radially inner material forming the other of the conical sleeve and the base shaft, the radially inner material having a higher coefficient of thermal expansion than the radially outer material such that thermal expansion of the radially inner material increases frictional engagement between the rotor shaft seat and a plate stack supported thereon.

4. The rotor shaft of claim 1, wherein the conical sleeve is slotted in an axial direction.

5. The rotor shaft of claim 1, wherein the rotor shaft is a hollow shaft comprising a cavity.

6. The rotor shaft of claim 1, wherein the conical sleeve surrounds the base shaft, and the rotor shaft seat is configured on an outer lateral surface of the conical sleeve.

7. The rotor shaft of claim 1, wherein the base shaft includes a plurality of parts connected to each other with a material bond, positive mechanical fitting, frictional fitting, or a combination thereof.

8. The rotor shaft of claim 1, wherein a wall thickness ($D_W$) of the base shaft proximate the rotor shaft seat is less than 8 mm.

9. The rotor shaft of claim 1, wherein the rotor shaft is a rotor shaft of a rotor of an electric machine.

10. The rotor shaft of claim 9, wherein the electric machine is a vehicle.

11. A method of manufacturing the rotor shaft of claim 1, the method comprising:
providing the base shaft and the conical sleeve for the rotor shaft, and
tensioning the conical sleeve relative to the base shaft to achieve a frictional fit between the rotor shaft and the plate stack arranged thereon.

12. A rotor shaft comprising:
a base shaft including a lateral surface having a conical shape;
a rotor shaft seat configured to support a plate stack, the rotor shaft seat located on an outer lateral surface of the rotor shaft in the area of the base shaft, and
a conical sleeve including a lateral surface having a conical shape, the lateral surface of the conical sleeve facing the lateral surface of the base shaft, the conical shapes of the base shaft and the conical sleeve running opposite each other, wherein the conical sleeve is in contact with an inner lateral surface of the base shaft, and the rotor shaft seat is configured on an outer lateral surface of the base shaft.

13. The rotor shaft of claim 12, wherein the conical sleeve is tensioned relative to the base shaft with at least one fastening element to exert a radially acting force on the plate stack.

14. The rotor shaft of claim 12, wherein the base shaft includes a cavity, and a cooling device is arranged in the cavity, the cooling device configured to increase a surface area of an inner lateral surface of the base shaft and direct a cooling fluid in the base shaft, the cooling device and the base shaft being made from different materials having different coefficient of thermal conductivity and/or coefficient of thermal expansion.

15. The rotor shaft of claim 12, wherein the conical sleeve is configured as a cooling device.

16. A rotor shaft comprising:

a base shaft including a lateral surface having a conical shape;

a rotor shaft seat configured to support a plate stack, the rotor shaft seat located on an outer lateral surface of the rotor shaft in the area of the base shaft; and a conical sleeve including a lateral surface having a conical shape, the lateral surface of the conical sleeve facing the lateral surface of the base shaft, the conical shapes of the base shaft and the conical sleeve running opposite each other, wherein the conical sleeve comprises at least two concentric sleeve parts arranged radially successively with the base shaft to form a multi-layer radial layup including the base shaft and at least two concentric sleeve parts.

17. The rotor shaft of claim 16, wherein the at least two concentric sleeve parts are each conically shaped and are located opposite each other.

18. The rotor shaft of claim 16, wherein an outer lateral surface of a first sleeve part has a generally cylindrical shape, and an inner lateral surface of the first sleeve part has a conical shape that corresponds to an outer lateral surface of a second sleeve part.

* * * * *